United States Patent [19]

Vitaloni

[11] E Patent Number: Re. 32,639

[45] Reissued Date of Patent: Apr. 12, 1988

[54] REAR VIEW MIRROR

[75] Inventor: Alberto Vitaloni, Turin, Italy

[73] Assignee: Vitaloni S.p.A., Beinasco, Italy

[21] Appl. No.: 32,726

[22] Filed: Apr. 1, 1987

Related U.S. Patent Documents

Reissue of:

[64] Patent No.: Des. 287,000
Issued: Dec. 2, 1986
Appl. No.: 582,780
Filed: Feb. 23, 1984

[30] Foreign Application Priority Data

Sep. 12, 1983 [IT] Italy ..... 53708[U]

[52] U.S. Cl. ..... D12/187

[58] Field of Search ..... D12/187; 350/600, 631-636

[56] References Cited

U.S. PATENT DOCUMENTS

| | | | |
|---|---|---|---|
| D. 261,754 | 11/1981 | Vitaloni | D12/187 |
| D. 271,480 | 11/1983 | Vitaloni | D12/187 |
| D. 279,666 | 7/1985 | Tanaka | D12/187 |
| D. 282,537 | 2/1986 | Vitaloni | D12/187 |

*Primary Examiner*—James M. Gandy
*Attorney, Agent, or Firm*—Robbins & Laramie

[57] CLAIM

The ornamental design for a rear view mirror, as shown and described.

DESCRIPTION

Figure 1:
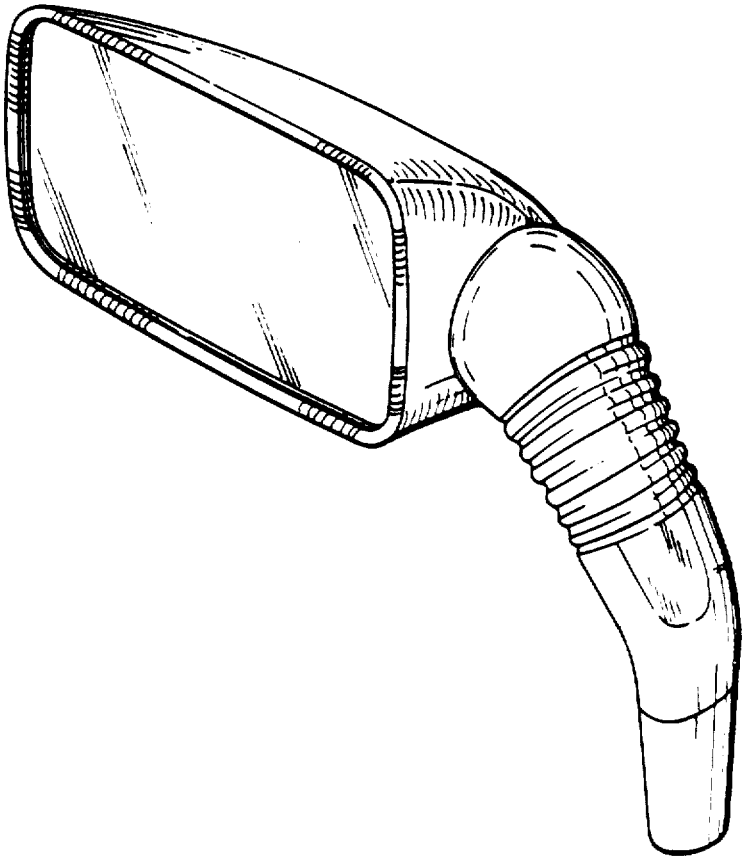
FIG. 1 is a perspective view of the front, top and one side of a rear view mirror showing my new design which is mountable on the left side of a motor vehicle.
Figure 2:
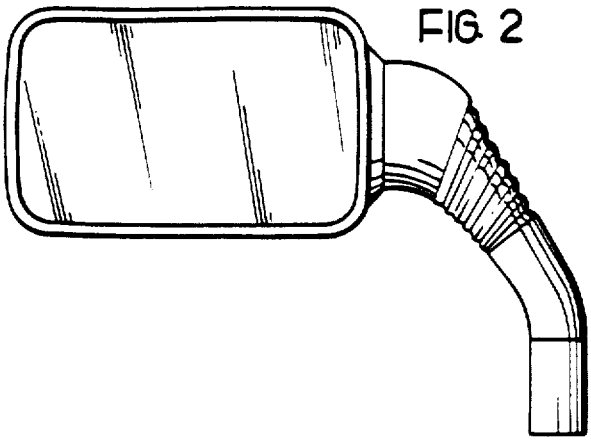
FIG. 2 is a front elevational view thereof.
Figure 3:
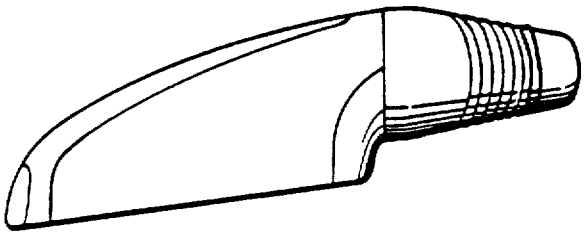
FIG. 3 is a top plan view thereof.
Figure 4:
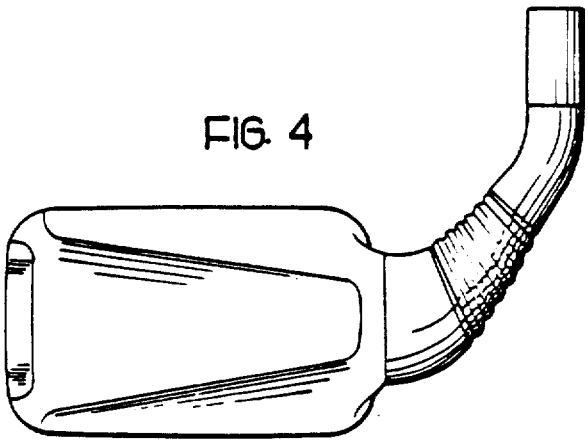
FIG. 4 is a rear elevational view thereof in inverted condition.
Figure 5:
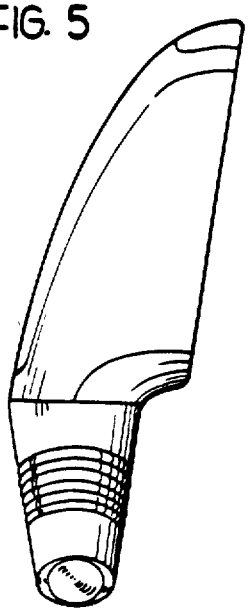
FIG. 5 is a bottom plan view thereof.
Figure 6:
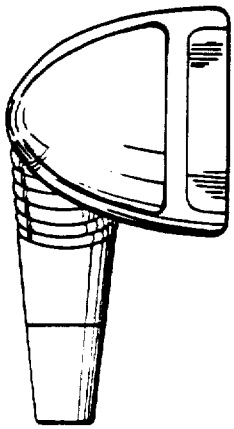
FIG. 6 is an elevational view of one side thereof.
Figure 7:
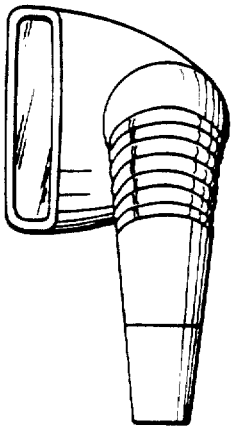
FIG. 7 is an elevational view of the other side thereof.
Figure 8:
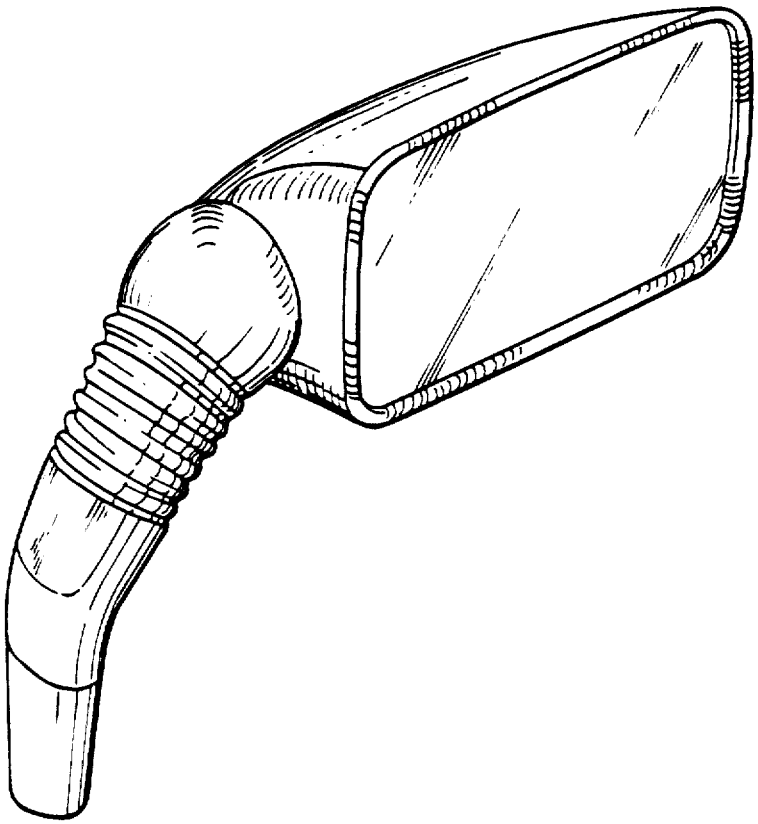
FIG. 8 is a perspective view of the front, top and one side or a rear view mirror showing a second embodiment of my new design, the sole difference being that it is mountable on the left side of a motor vehicle.
Figure 9:
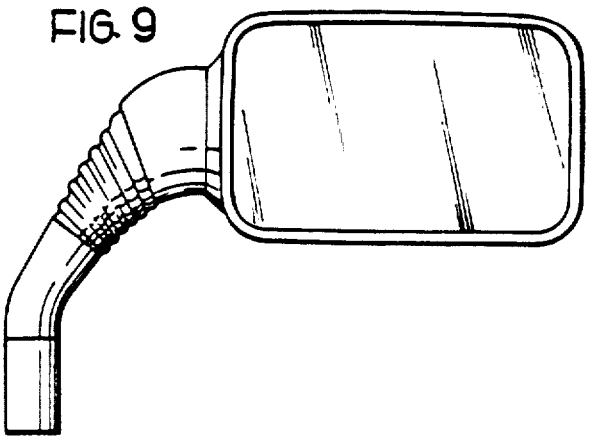
FIG. 9 is a front elevational view of the embodiment of FIG. 8.
Figure 10:
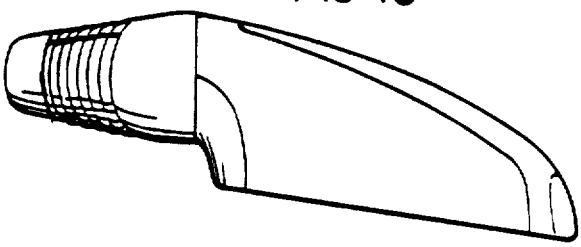
FIG. 10 is a top plan view of the embodiment of FIG. 8.
Figure 11:
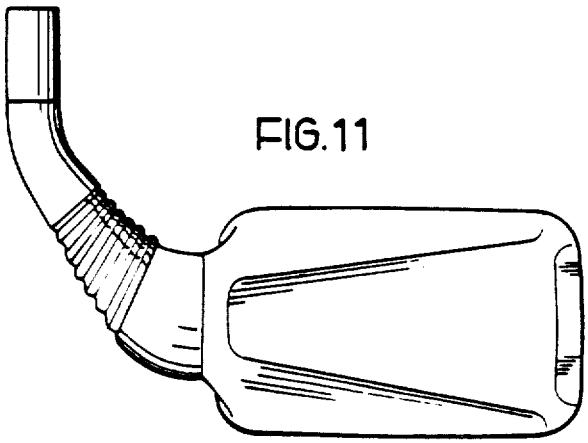
FIG. 11 is a rear elevational view of the embodiment of FIG. 8 in inverted condition.
Figure 12:
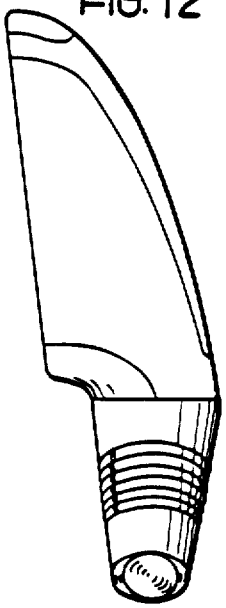
FIG. 12 is a bottom plan view of the embodiment of FIG. 8.
Figure 14:
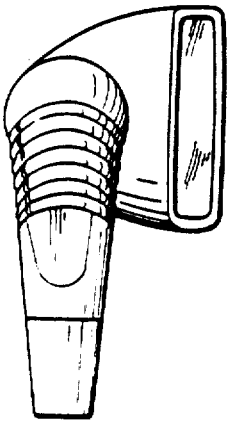
FIG. 14 is an elevational view of the other side of the embodiment of FIG. 8.
Figure 13:
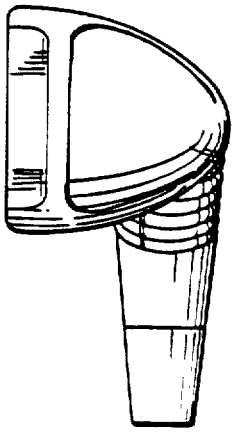
FIG. 13 is an elevational view of one side of the embodiment of FIG. 8.

1 Claim, 6 Drawing Sheets